United States Patent
Ozue

(10) Patent No.: US 7,239,466 B2
(45) Date of Patent: Jul. 3, 2007

(54) MAGNETIC HEAD DEVICE AND MAGNETIC RECORDING DEVICE

(75) Inventor: Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 11/170,500

(22) Filed: Jun. 29, 2005

(65) Prior Publication Data

US 2006/0012907 A1    Jan. 19, 2006

(30) Foreign Application Priority Data

Jul. 13, 2004    (JP)    ............................ P2004-206139

(51) Int. Cl.
*G11B 5/02*    (2006.01)
(52) U.S. Cl. .......................................... 360/64; 360/55
(58) Field of Classification Search ...................... None
See application file for complete search history.

(56) References Cited

U.S. PATENT DOCUMENTS 6,141,166 A * 10/2000 Ozue ........................... 360/64
6,801,379 B2 * 10/2004 Ozue et al. .................... 360/55
7,092,187 B2 * 8/2006 Tsuchiya et al. .............. 360/64
2002/0135918 A1 * 9/2002 Ozue et al. .................... 360/55

FOREIGN PATENT DOCUMENTS

JP    2002-216313    8/2002

* cited by examiner

*Primary Examiner*—Andrea Wellington
*Assistant Examiner*—Varsha A. Kapadia
(74) *Attorney, Agent, or Firm*—Bell, Boyd & Loyd LLP

(57) ABSTRACT

The present invention provides a magnetic head device for recording magnetic signals simultaneously through a plurality of recording heads into recording tracks laid oblique to a running direction of a magnetic tape, which includes first group to m-th group of multi-heads, each group having "q" recording heads disposed side by side as being shifted in a recording direction into the recording tracks to form (q×m) recording tracks with an identical recording width Tp. Every adjacent groups of the multi-head being disposed as being shifted from each other on the same straight line by a distance D determined by the equation to simultaneously form the recording tracks of first group to m-th group:

$$D = Tp \times q \times (m \times n + 1)$$

where, Tp>0, q and m are integers of 2 or larger, and n is an integer of 0 or lager.

5 Claims, 5 Drawing Sheets

MAGNETIC HEAD DEVICE AND MAGNETIC RECORDING DEVICE

CROSS REFERENCE TO RELATED APPLICATION

The present invention claims priority to Japanese Patent Application JP 2004-206139, filed in the Japanese Patent Office on Jul. 13, 2004, the entire contents of which being incorporated herein by reference.

BACKGROUND

The present invention relates to a magnetic head device capable of recording magnetic signals simultaneously through a plurality of recording heads into a plurality of recording tracks laid oblique to a running direction of a magnetic tape, and a magnetic recording apparatus, and in particular to a magnetic recording apparatus for which a running speed of a magnetic tape and a rotation speed of a rotating drum are set so as to enable simultaneous recording of a plurality of tracks using a thin film multi-head having a plurality of gaps, and to record magnetic signals with the same track width.

There are increasing demands on larger recording density for recent thin film magnetic recording heads, aiming at increasing capacity of magnetic recording media, and there are more opportunities of adopting thin film magnetic recording heads suitable for narrowing the track width. With a magnetic recording/reproducing apparatus of a helical scan system, capable of recording magnetic signals in an oblique direction with respect to the running direction of a magnetic tape, it is made possible to simultaneously record magnetic signals into a plurality of recording tracks, and to simultaneously reproduce magnetic signals from a plurality of recording tracks, by providing a plurality of recording heads and a plurality of reproduction heads to a rotating drum. The multi-head of this sort of magnetic recording/reproducing apparatus is configured as a recording device (thin film multi-head) having a multi-gap composed of thin film elements.

The thin film multi-head is described typically in Published Japanese Patent Application "KOKAI" No. 2002-216313 (paragraphs [0019] to [0033], FIG. 2) (Patent Document 1). The invention described in Patent Document 1, aimed at increasing recording density through multiplication of the thin film magnetic recording head, is configured so that, on a non-magnetic substrate having an insulating layer formed thereon, a magnetic recording head configured by stacking a pair of thin film magnetic poles, holding a predetermined gap in between, and a magnetic shielding layer, in this order, is provided, and further in the stacking direction, a magnetic shielding layer and a pair of thin film magnetic poles, holding a predetermined gap in between, are stacked in this order, wherein thus-stacked plurality of pairs of thin film magnetic poles are formed as being shifted in the direction nearly orthogonal to the stacking direction (widthwise direction).

The individual recording heads of the thin film multi-head are formed as being shifted from each other in the direction orthogonal to the direction of gap, and so that end portions of every pair of magnetic poles respectively overlap the adjacent magnetic poles as viewed in the stacking direction. This makes it possible to reduce track width of the recording tracks recorded on a magnetic tape, contributing to higher recording density.

SUMMARY

In the thin film multi-head, increase in the number (N) of recording heads formed therein results in increase in the recording density, and in a higher transmission rate of recorded data. Increase in the number N of the recording heads, however, demands increase in the number of films composing the thin film multi-head. A problem has, therefore, arisen in a thin film process fabricating the thin film multi-head, that increase in the number of films in a single thin film multi-head results in higher costs, and makes it difficult to form the recording tracks with a high density while ensuring desirable process accuracy.

Even if the recording heads should successfully be provided with a high density on the thin film multi-head, a magnetic recording apparatus, having such multi-head mounted on the rotating drum and forming the recording tracks on a magnetic tape, may produce errors (fluctuation) in the track width of the recording tracks, if accuracy of the recording width varies among the individual recording heads of the thin film multi-head, typically due to stretching/shrinkage of the magnetic tape or fluctuation during running of the tape. Similar variation (fluctuation) in the track width of the recording tracks may occur also when accuracy in assembly of the recording heads degrades, or the rotating drum having the thin film multi-head mounted thereon fluctuates.

Above-described fluctuation in the track width of the recording tracks has also raised another problem that it is made difficult for a multi-head having a plurality of reproduction heads to accurately reproduce magnetic information from the magnetic tape.

In consideration of the above-described problems, the present invention provides a magnetic head device capable of raising recording density and achieving higher transmission rate of recording data, without degrading positional accuracy of magnetic poles in a multi-head.

The present invention also provides a magnetic recording apparatus capable of raising recording density, achieving higher transmission rate of recording data, as well as accurately reproducing magnetic information, without degrading positional accuracy of magnetic poles in a multi-head.

The magnetic head device according to the present invention is a magnetic head device capable of recording magnetic signals simultaneously through a plurality of recording heads into a plurality of recording tracks laid oblique to a running direction of a magnetic tape. The magnetic head device includes first group to m-th group of multi-heads, each group having "q" recording heads disposed side by side as being shifted in a recording direction into the recording tracks, so as to form (q×m) recording tracks with an identical recording width, every adjacent groups of the multi-head being disposed as being shifted from each other on the same straight line by a distance D determined by the equation (1), so as to simultaneously form the recording tracks of first group to m-th group:

$$D = Tp \times q \times (m \times n + 1) \qquad (1)$$

where, Tp>0, q and m are integers of 2 or larger, and n is an integer of 0 or lager and indicates a number of unrecording regions of recording track groups in a single rotation of the rotating drum having the magnetic head device.

This sort of magnetic head device, attached to a rotating drum to scan a magnetic tape, can form recording tracks by a single scan and can form recording track by the next scan at positions shifted by a distance of (Tp×q×m) relative to the magnetic tape, allowing the recording tracks to be formed without producing gaps therebetween.

According to the present invention, there is also provided a magnetic recording apparatus capable of recording magnetic signals simultaneously through a plurality of recording heads in an oblique direction with respect to a running direction of a magnetic tape. The magnetic recording apparatus includes a tape running unit allowing the magnetic tape to run at a predetermined speed, a magnetic head device which comprises first group to m-th group of multi-heads, each group having "q" recording heads disposed side by side as being shifted in a recording direction into recording tracks, so as to form (q×m) recording tracks with an identical recording width, and a rotating drum having the magnetic head mounted thereon, and rotating at a predetermined rotation speed relative to a running speed of the magnetic head, wherein every adjacent groups of the multi-head are disposed as being shifted from each other on the same straight line by a distance of D determined by the equation (2), so as to simultaneously form the recording tracks of first group to m-th group, and the rotation speed of the rotating drum and the running speed of the magnetic tape are adjusted so that the magnetic head forms recording tracks by a single scan and forms recording tracks by the next scan at positions shifted relative to the magnetic tape by a distance P determined by the equation (3):

$$D = Tp \times q \times (m \times n + 1) \quad (2)$$

$$P = Tp \times q \times m \quad (3)$$

where, Tp>0, q and m are integers of 2 or larger, and n is an integer of 0 or lager and indicates a number of unrecording regions of recording track groups in a single rotation of the rotating drum having the magnetic head device.

This sort of recording apparatus makes recording so that position of the magnetic head device relative to the magnetic tape is shifted in every scan, by the distance P determined by the equation (3) in the width-wise direction of the recording tracks, allowing the recording tracks to be formed without producing gaps therebetween.

According to the present invention, it is made possible to increase the number of simultaneously-recordable recording tracks without increasing the number of recording heads in a multi-head. It is therefore made possible to achieve a higher transmission rate of recording data, while reducing, in particular for a case where the recording heads are formed by the thin-film process, the number of films to thereby reduce the production cost, and also narrowing pitch of simultaneously-formed tracks with a desirable accuracy.

Additional features and advantages of the present invention are described in, and will be apparent from, the following Detailed Description and the figures.

DETAILED DESCRIPTION

Embodiments of the present invention will be described below referring to the attached drawings.

Figure 1:
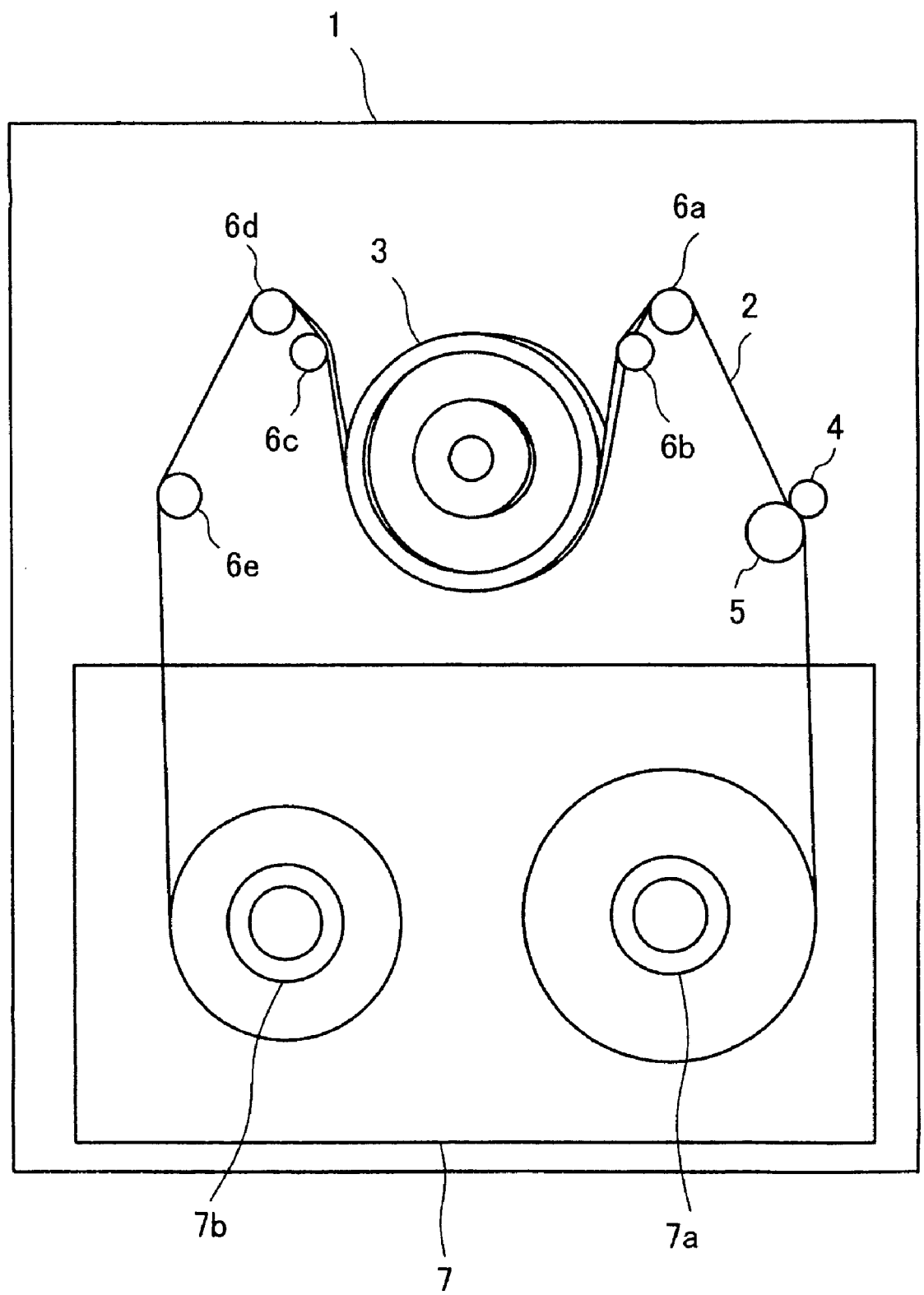
FIG. 1 is a drawing schematically showing a magnetic tape running system of a magnetic recording/reproducing apparatus equipped with a rotating head drum device applied with the present invention.

FIG. 1 is a drawing schematically showing a magnetic tape running system in a magnetic recording/reproducing apparatus equipped with a rotating head drum device applied with the present invention. The magnetic recording/reproducing apparatus illustrated herein is equipped with a magnetic head device based on the helical scan system, capable of recording magnetic signals into eight channels at a time on a running magnetic tape, using two groups of multi-heads each comprising four recording heads.

A magnetic recording/reproducing apparatus 1 shown in FIG. 1 is an apparatus capable of recording and reproducing signals, employing a magnetic tape 2 as a recording medium, and is used typically as a data storage (data streamer) for computer apparatuses. As shown in FIG. 1, the magnetic recording/reproducing apparatus 1 comprises a rotating head drum device 3 writing and reading signals into or out from the magnetic tape 2 running in an oblique direction relative thereto, a capstan 4 and a pinch roller 5 allowing the magnetic tape 2 to run at a predetermined speed, and a plurality of tape guides (TG) 6a, 6b, 6c, 6d and 6e assisting the running of the magnetic tape 2. A cassette case 7 inserted into the magnetic recording/reproducing apparatus 1 has a take-up reel 7a and a supply reel 7a for the magnetic tape 2.

The rotating head drum device 3 has a cylindrical shape as a whole with a smooth circumferential surface, and is divided into a rotating drum, and a fixed drum axially supporting the shaft thereof so as to allow it to freely rotate therearound. On the circumferential surface of the rotating head drum device 3, there are provided a reproduction head section and a recording head section, each of which having a multi-head structure, capable of simultaneous recording and reproduction for a plurality of channels, configured so as to allow the individual magnetic heads to simultaneously scan a plurality of oblique tracks on the magnetic tape 2 running on the circumferential surface of the rotating drum as it rotates.

When recording and reproduction to and from the magnetic tape 2 are performed in the magnetic recording/reproducing apparatus 1, the cassette case 7 inserted upward from the bottom in FIG. 1 is set at a position in a close proximity to the rotating head drum device 3. With rotation of the rotating drum of the rotating head drum device 3, the pinch roller 5, the TGs 6a to 6e and so forth move upward in the drawing so as to activate an operation of loading the magnetic tape 2, and thereby making the magnetic tape 2 wound around a part of the circumferential surface of the rotating head drum device 3. In addition, the capstan 4 and the wind-up reel 7a rotate to make the magnetic tape 2 run, and make the individual magnetic heads on the rotating drum scan the surface of the magnetic tape 2, thereby writing and reading of signals are started.

Figure 2:
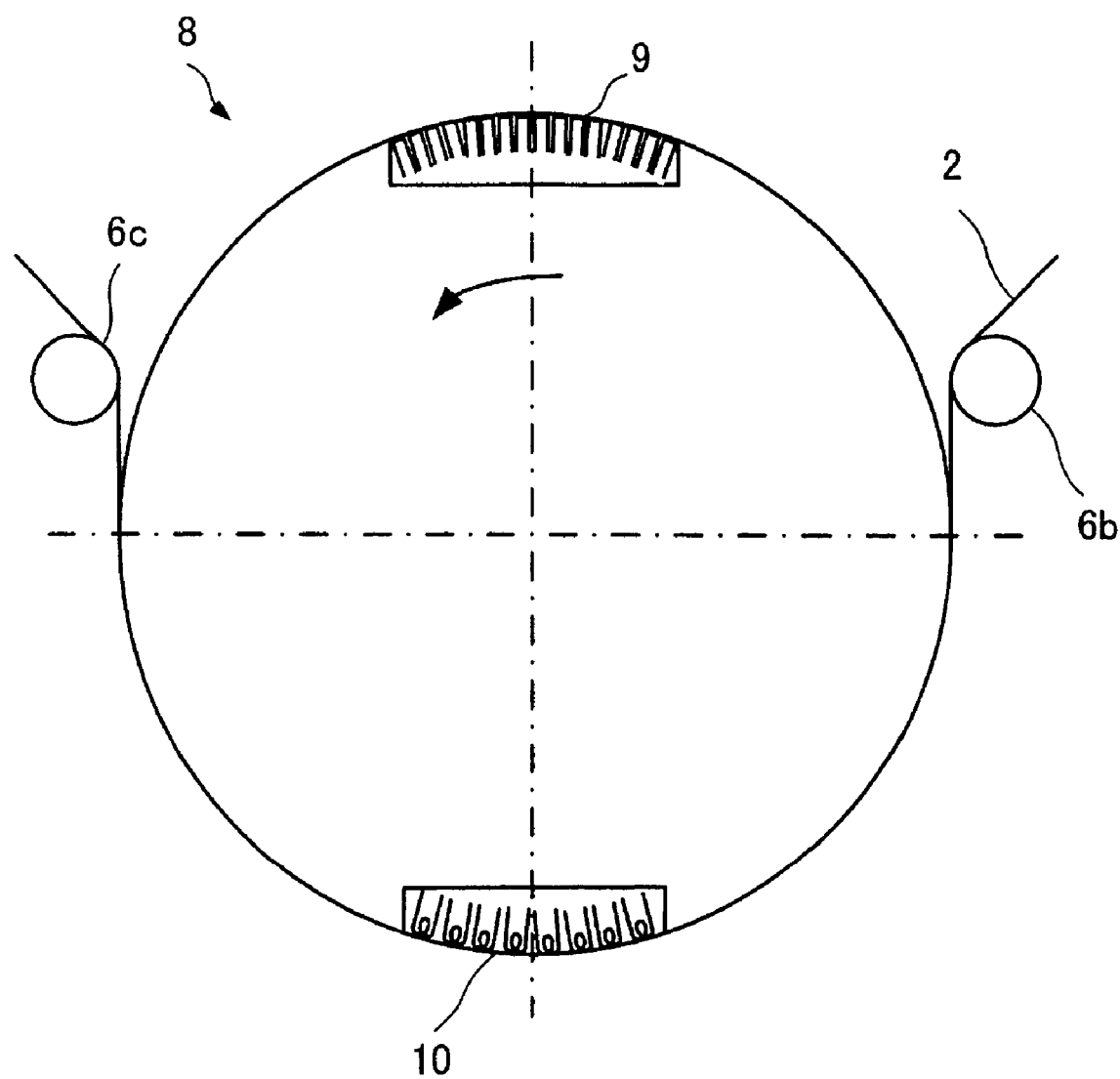
FIG. 2 is a plan view of a rotating drum, showing arrangement of a recording head and a reproduction head in the rotating head drum device.

FIG. 2 is a plan view showing an arrangement of the recording head and the reproduction head in the rotating head drum device 3. In this embodiment, one each of a reproduction head section 9 and a recording head section 10, for example, are disposed on a circumferential portion of a rotating drum 8, at opposing positions 180° away from each other. The recording head section 10 of the rotating drum 8 is configured as an eight-channel multi-recording head having eight magnetic heads formed in a single chip, as shown later in FIG. 3.

By allowing the magnetic tape 2 to run as being helically wrapped on the circumferential surface of the rotating drum 8 having these magnetic heads disposed thereon, it is made possible that signals for eight channels are magnetically recorded at a time into two groups of recording tracks spaced by a predetermined distance in a duration of time during which the individual magnetic heads are brought into contact with the magnetic tape 2.

Figure 3:
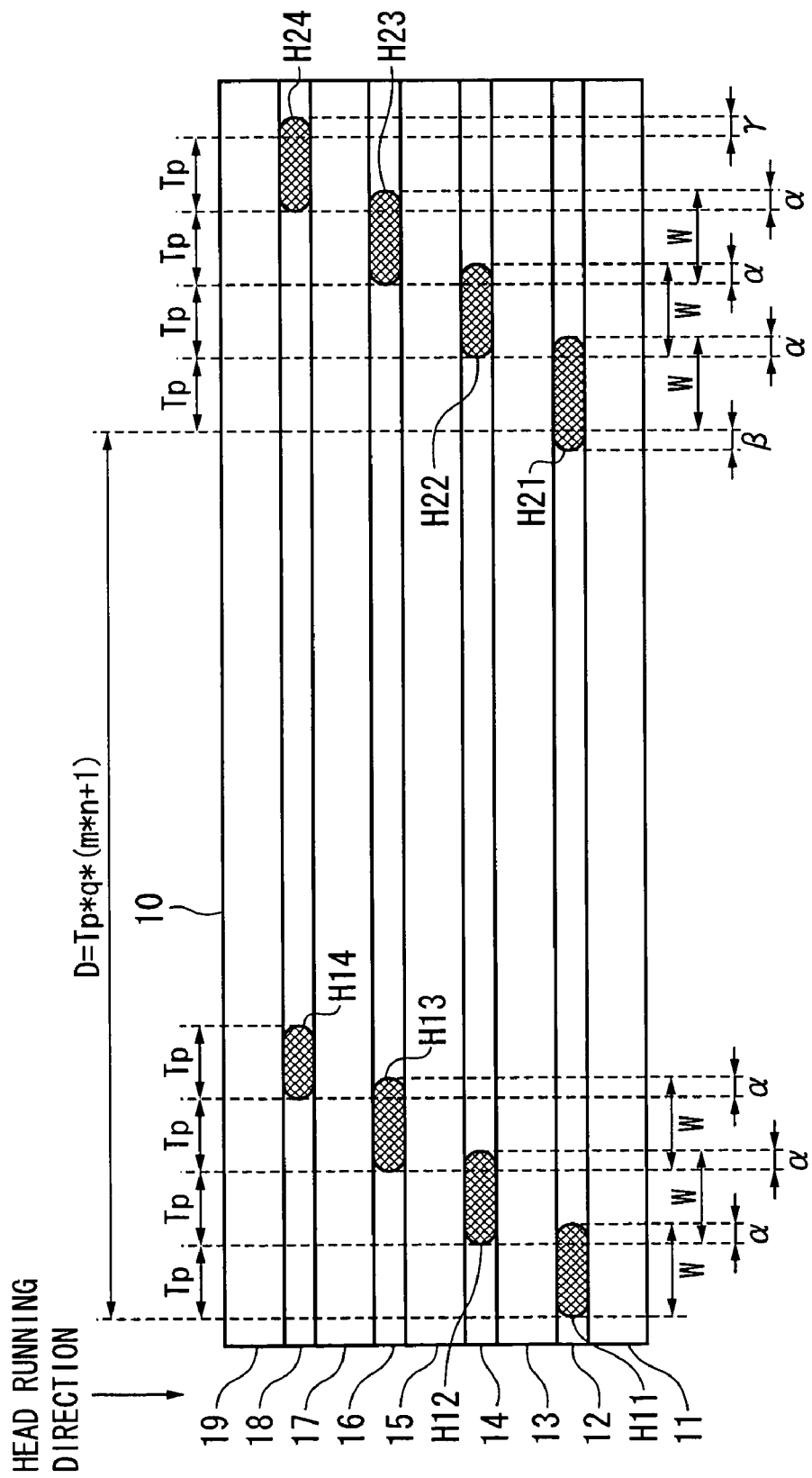
FIG. 3 is a drawing showing an exemplary configuration of a recording head section capable of recording eight recording tracks at a time.

FIG. 3 is a drawing showing an exemplary configuration of the recording head section 10 capable of recording eight recording tracks at a time. In FIG. 3, a head chip in the recording head section 10 is configured as a multi-recording head having two (=m) groups of multi-heads integrated therein by a thin film technology. In this example, four (=q) magnetic heads H11 to H14 disposed adjacent to each other composes the multi-head of a first group, and another four magnetic heads H21 to H24 composes a multi-head of a second group.

These two groups of multi-heads are adjacent to each other on the head chip of the recording head section 10, and arranged as being shifted from each other by a distance D determined by the equation (4) below:

$$D = Tp \times q \times (m \times n + 1) \quad (4)$$

where, Tp represents width of the recording track and Tp>0, and n is an integer of 0 or lager and indicates a number of unrecording regions of recording track groups in a single rotation of the rotating drum having the magnetic head device. In this embodiment, the equation (4) with set values of q=4, m=2 and n=1 will give a distance D of 12 Tp.

The individual magnetic heads H11 to H14, and H21 to H24 configure pairs of magnetic poles, in which nearly U-shaped end portions of each core serve as a lower magnetic pole and an upper magnetic pole, and a gap between each pair of magnetic poles serves as a magnetic recording gap.

A specific configuration of the recording head section 10 will be described below. The recording head section 10 has the magnetic head H11 of the first group and the magnetic head H21 of the second group arranged on a lower shield 11 thereof which corresponds to the front in the running direction of the head, and has a protective layer 12 formed in the remaining portion of the same level on the lower shield 11, as viewed in the stacking direction. The magnetic head H12 of the first group and the magnetic head H22 of the second group are disposed so as to overlap the right ends of magnetic poles of the magnetic heads H11, H21, respectively, by a predetermined overlapping width, which is typically a fixed width α, while respectively placing an intermediate shield 13 having a predetermined thickness in the recording direction, and there is also provided a protective layer 14 formed in the remaining portion of the same level. The magnetic heads H12, H22 herein are disposed at positions distant from each other by a predetermined distance D determined by the equation (4) in the above.

Similarly, the magnetic head H13 of the first group and the magnetic head H23 of the second group are disposed so as to overlap the right ends of magnetic poles of the magnetic heads H12, H22, respectively, by a predetermined overlapping width α, while respectively placing an intermediate shield 15 having a predetermined thickness, and there is also provided a protective layer 16 formed in the remaining portion of the same level. Moreover, the magnetic head H14 of the first group and the magnetic head H24 of the second group are disposed so as to overlap the right ends of magnetic poles of the magnetic heads H13, H23, respectively, by a predetermined overlapping width α, while respectively placing an intermediate shield 17 having a predetermined thickness, and there is also provided a protective layer 18 formed in the remaining portion of the same level, and further thereon an upper shield 19 is provided. The magnetic heads H13 and H23, and the magnetic heads H14 and H24 herein are respectively disposed at positions distant from each other by a predetermined distance D determined by the equation (4) in the above.

It is to be noted that the gaps of the individual magnetic heads H11 to H14, and H21 to H24 are formed in parallel with each other, and the individual intermediate shields 13, 15, 17 have an identical thickness.

In this way, the magnetic head H11 to H14, and H21 to H24 of the individual groups of the recording head section 10 are disposed so as to overlap the respective end portions of the magnetic poles in the direction of recording by a predetermined width α. In the multi-head of the first group, the magnetic heads H11 to H13 are formed with an identical magnetic pole width W, but only the magnetic head H14 used for recording magnetic signals into the fourth recording track is formed with a magnetic pole width equal to the recording width Tp (=W−α) of the recording track, narrower than W, allowing recording of magnetic signals into four recording tracks.

Use of the first group of the multi-head consequently results in that a recording track formed by the magnetic head H11, placed ahead in the running direction in the recording head section 10, is overwritten by a recording track formed by the adjacent magnetic head H12, the recording track is then similarly overwritten by a track formed by the adjacent magnetic head H13, and recording track is further overwritten by a track formed by the adjacent magnetic head H14. Consequently, use of the first group of the multi-head makes it possible to form four recording tracks having an identical recording width Tp.

In contrast, in the second group of multi-head, the magnetic heads H22 and H23 are formed with an identical magnetic pole width W, but the magnetic head H21 used for recording magnetic signals into the first recording track is formed with a larger magnetic pole width (=W+β). The magnetic head H24 used for recording magnetic signals into the fourth (i.e., q-th) recording track is formed with a magnetic pole width (=Tp+γ) wider than the recording width Tp of the recording track.

Use of the second group of the multi-head consequently results in that the recording track formed by the magnetic head H21, placed ahead in the running direction in the recording head section 10, is overwritten by a recording track formed by the adjacent magnetic head H22, forming the recording track having width (Tp+β), because the magnetic head H21 is formed with a magnetic pole width (=W+β) wider than W. Because the left edge portion of the recording track will be overwritten later by the edge portion of another magnetic head as described later, such recording width set wider than Tp makes it possible to form recording tracks without producing gaps therebetween.

The recording track formed by the magnetic head H22 is overwritten by a recording track formed by the adjacent magnetic head H23, and this is further overwritten by a recording track formed by the adjacent magnetic head H24, resulting in formation of the recording tracks with the width Tp.

A recording track formed by the magnetic head H24 overwrites a recording track formed by the magnetic head H23, and is recorded while keeping the magnetic pole width (Tp+γ) unchanged. As described below, also the recording track formed by the magnetic head H24 will be overwritten later by the end portion of another magnetic head, so that a recording width set wider than Tp makes it possible to form the recording tracks without producing gaps therebetween.

Values of β and γ in the above are preferably designed to be equal to the overlapping width α of every adjacent magnetic heads in the individual groups of the multi-head. This successfully makes the recording tracks formed by the magnetic heads H21 and H24 equally have a recording width of Tp, after being overwritten by the end portions of other magnetic heads. In practice, the values for β and γ are, however, determined so that the recording tracks can be formed without producing gaps therebetween, in consideration of mechanical errors ascribable to vibration of the rotating drum 8 and the magnetic tape 2.

In this sort of head chip, each of the individual magnetic heads H11 to H14, and H21 to H24 can be configured as a single-ring-type inductive head having a pair of film-formed permalloy magnetic poles formed as holding a predetermined gap G in between. The individual magnetic heads H11 to H14, and H21 to H24 therefore make it possible to suppress errors in accuracy of the recording width Tp to as small as 0.1 μm, when they are fabricated by the thin-film process as described in the next.

Figure 4:
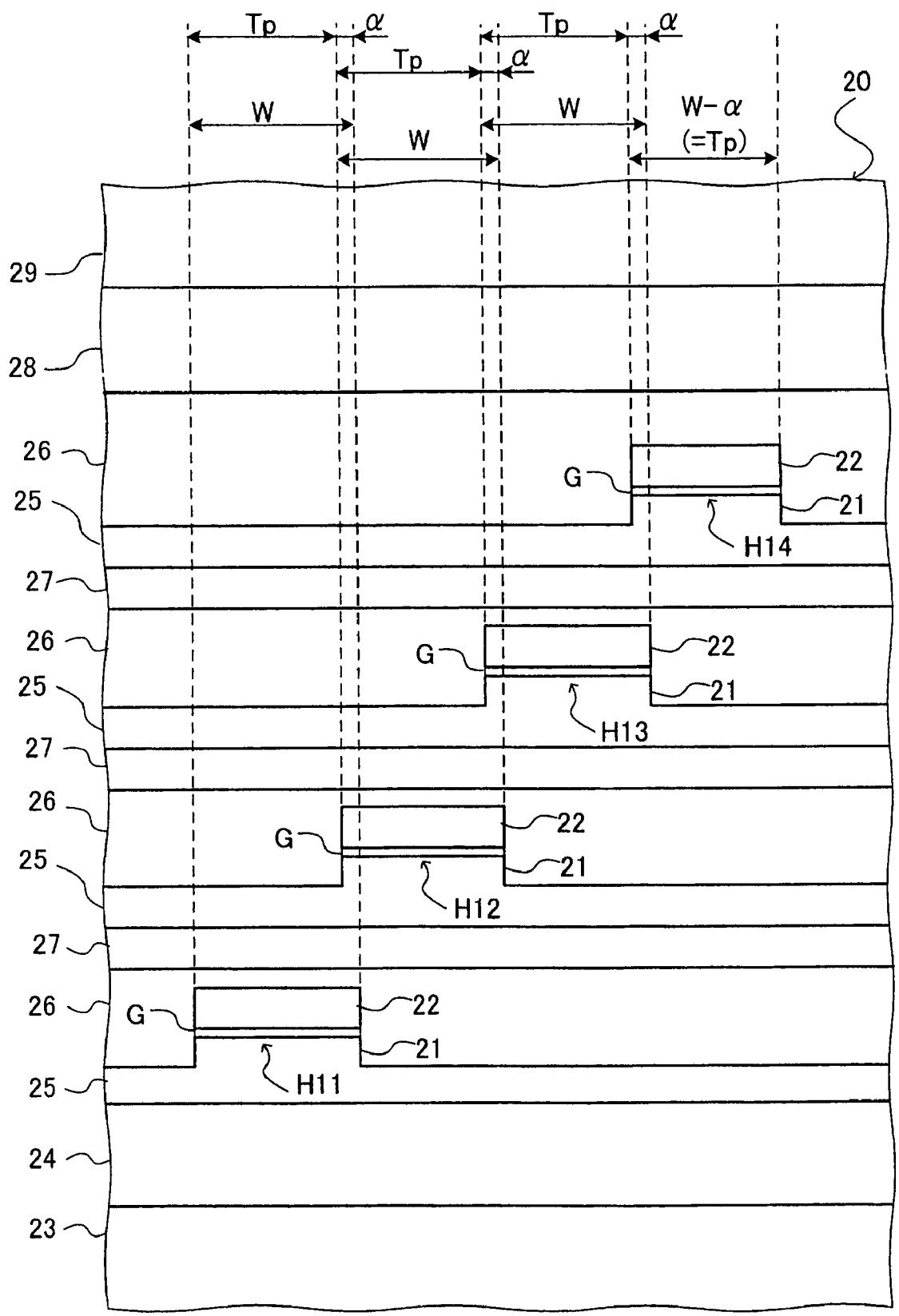
FIG. 4 is a plan view showing a part of a head chip for recording composing the multi-head shown in FIG. 3.

A multi-head equipped with a plurality of thin-film magnetic heads fabricated by the thin-film technology will be described below. FIG. 4 is a plan view showing a part of a head chip for recording composing the multi-head shown in FIG. 3. An illustrated recording head chip 20 shows only four magnetic heads H11 to H14. The magnetic heads H11 to H14 are arranged as being shifted from each other in the direction orthogonal to the magnetic gap G, and so that every adjacent end portions of the individual pairs of the magnetic poles are overlapped, forming a group of multi-head. The recording head chip 20 is configured as an inductive type multi-head, in which thin-film magnetic heads, each comprising magnetic cores 21, 22, both being composed of a soft magnetic material, bonded while placing the magnetic gap G composed of a non-magnetic material in between, and an unillustrated coil wound around the magnetic cores 21, 22, are formed in an integrated manner on a ceramic substrate 23 typically composed of AlTiC ($Al_2O_3TiC$).

In one specific configuration of the magnetic head H11, an insulating layer composed of a first magnetic head member 24 is disposed on the ceramic substrate 23, and further thereon, a lower pole 25 configuring the magnetic core 21 with a predetermined width is disposed. On the lower pole 25, an insulating layer 26 is formed using $SiO_2$ or a photoresist cured by thermal treatment, the unillustrated coil is formed, and the magnetic core 22 which serves as an upper pole is formed while ensuring a predetermined gap G in between.

In the next magnetic head H12, a pair of magnetic cores 21, 22 are similarly formed in a predetermined region of the lower pole 25 and the insulating layer 26, while placing an insulating layer composed of a second magnetic head member 27 thereunder. The same will apply also to the magnetic head H13, H14 so that explanations therefor will be omitted, however, it is noted that a ceramic substrate 29 is disposed on the topmost layer of the recording head chip 20, while placing an insulating layer 28 thereunder.

As described in the above, regions where the individual magnetic heads H11 to H14 are formed occupy only partial portions in the direction orthogonal to the stacking direction, and the remaining portions on the same level in the stacking direction are respectively protected with a non-magnetic material.

The magnetic cores 21, 22, the magnetic head member 24, the lower pole 25 and so forth are composed of high permeability soft magnetic material, preferable examples of which include Ni—Fe (permalloy), Si—Al—Fe (sendust), and amorphous iron core material (high permeability thin strip).

The individual magnetic heads H11 to H13 herein are formed with an identical magnetic pole width W, and the magnetic head H14 is formed with a magnetic pole width Tp (=W−α) narrower than W. The individual magnetic heads H11 to H14 are shifted in a direction orthogonal to the stacking direction, and this successfully prevents the individual coils from interfering with each other. This makes it possible to arrange the individual magnetic heads H11 to H14 in any positional relations in the direction orthogonal to the stacking direction (i.e., width-wise direction).

In the recording head chip 20, the individual magnetic heads H11 to H14 are arranged as being shifted in the width-wise direction of the recording channel, and are formed so that the individual end portions of each pair of magnetic poles are respectively overlapped with the end portions adjacent thereto when viewed from the stacking direction. The recording width Tp achieved by the individual magnetic heads H11 to H13 therefore becomes smaller than the magnetic pole width of the individual magnetic heads H11 to H13, but the magnetic head H14 gives a recording width equal to the recording width Tp. The magnetic pole width W herein is typically set to 1.2 μm. The width of recording Tp is set smaller by 0.2 μm.

When information is recorded into a magnetic tape running in contact with, or in proximity to the recording head chip in this configuration, first, a recording track having a track width equal to the magnetic pole width W=1.2 μm is formed by the first magnetic head H11, and then a recording track having a track width of 1.2 μm is formed by the second magnetic head H12, allowing overlapping by a width α (=0.2 μm). All recording tracks, other than the one formed last, will therefore have a track width W of 1.2 μm, making it possible to form narrower recording tracks.

Thus-configured recording head chip 20, having the individual magnetic heads H11 to H14, which form a multi-head configuration, arranged as being overlapped in the width-wise direction of the individual pairs of the magnetic poles, and allowing overwrite operation between the adjacent recording tracks, makes it possible to narrow the individual track pitches as compared with the actual magnetic pole width of the magnetic heads H11 to H14, to thereby contribute to increase in the recording density.

Figure 5:
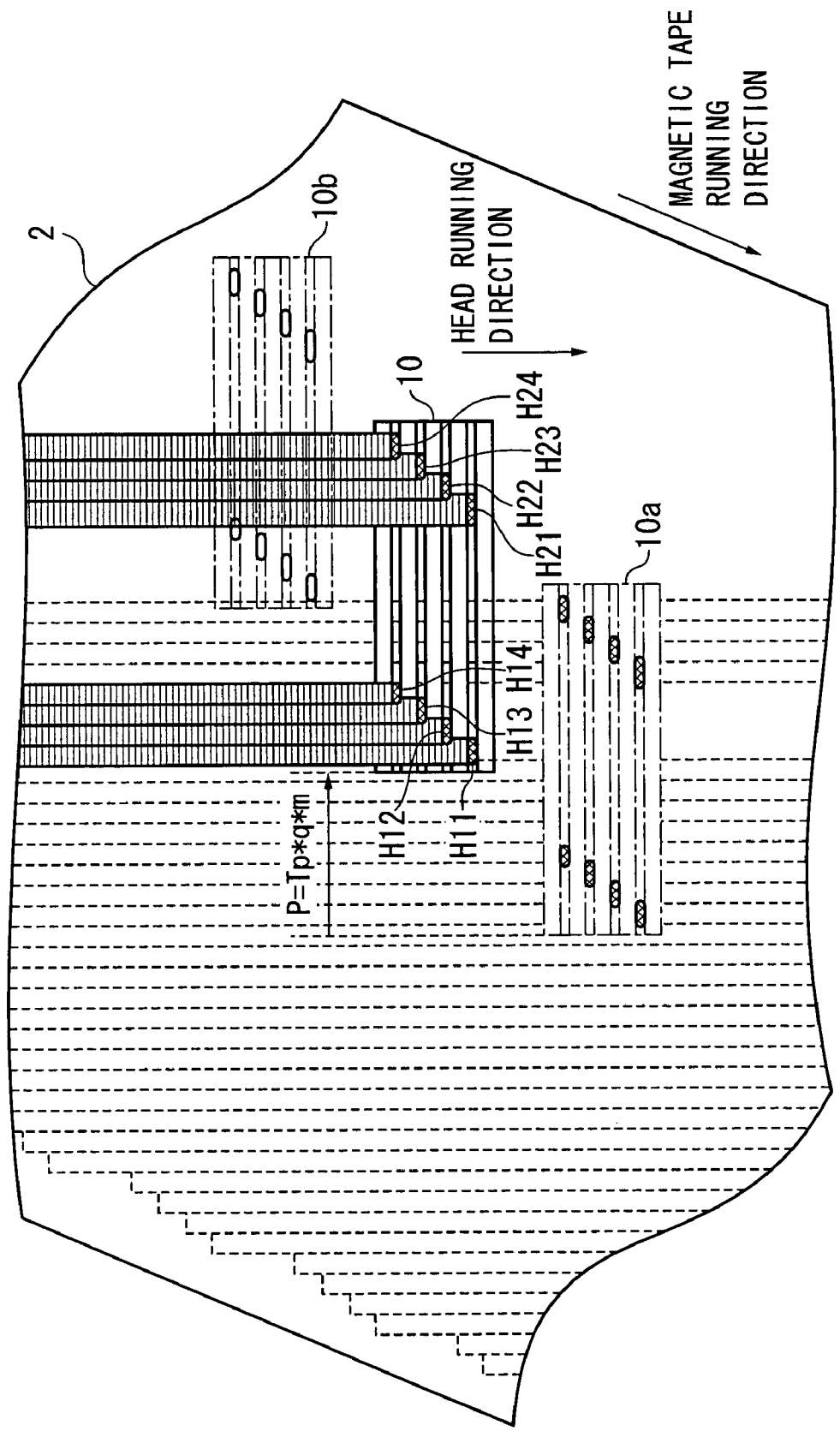
FIG. 5 is a drawing showing a track pattern recorded obliquely on a magnetic tape.

A track pattern on a magnetic tape produced by the magnetic recording/reproducing apparatus configured as shown in FIG. 1 to FIG. 3 will be described in the following. FIG. 5 is a drawing showing a track pattern obliquely recorded on the magnetic tape.

As shown in FIG. 5, when the magnetic tape 2 is allowed to run at a predetermined speed as the rotating drum 8 rotates, eight (=q) recording tracks, each having the recording width Tp, are formed at a time by the recording head section 10 on the magnetic tape 2 obliquely to the running direction. Recording head sections 10a and 10b indicated by dashed lines show positions, relative to the recording tracks, of the recording head section 10 one rotation cycle before, and one rotation cycle after, respectively, of the rotating drum.

An ideal recording track will now be considered assuming that there are no stretching/shrinkage of the magnetic tape 2, and no fluctuation during the tape running. In this situation, four recording tracks formed by the first group of multi-head of the recording head section 10 (referred to as "first-group recording track", hereinafter) and four recording tracks formed by the second group of multi-head (referred to as a "second-group recording track", hereinafter) are formed at positions shifted from each other by 12 Tp (i.e., at positions distant by 8 Tp).

The rotating drum 8 of the magnetic recording/reproducing apparatus is now set at a predetermined rotation speed relative to the running speed of the magnetic tape 2, and the magnetic tape 2 is allowed to run at a predetermined running speed, so as to form the first-group and second-group recording tracks at a position shifted by a distance P determined by the following equation (5) respectively, relative to the eight recording tracks formed by the individual magnetic heads H11 to H14, and H21 to H24 in a first rotation cycle of rotation of the rotating drum 8, and relative to the magnetic tape 2 in a second rotation cycle of the rotating drum 8.

$$P = Tp \times q \times m \tag{5}$$

In this embodiment, the equation (5) with set values of q=4 and m=2 will give a distance D of 8 Tp. As a consequence, the first-group recording track indicated by the solid line in FIG. 5 is formed at a position adjacent to the second-group recording track formed in the preceding cycle of rotation, as being overlapped on the edge portions thereof by a width $\beta$. The second-group recording tracks formed by the recording head section 10 in the preceding rotation cycle are therefore overwritten on the left edge of the recording track, formed by the magnetic head H21, having a recording width of (Tp+$\beta$), making all recording tracks have an identical recording width Tp.

A region having a width of (4 Tp-$\beta$-$\gamma$) remains unrecorded between both groups of recording tracks indicated by the solid lines in FIG. 5. The unrecorded region is a region in which the first-group recording track will be formed in the next rotation cycle of the rotating drum 8. More specifically, in parallel to formation of the recording tracks in the unrecorded region, overwriting occurs at the right edge portion of the recording track in the second-group recording track formed preceding for two rotation cycles, ascribable to the magnetic head H24 and having a recording width (Tp+$\gamma$), and also at the left edge portion of the recording track in the second-group recording track formed preceding for one rotation cycle, ascribable to the magnetic head H21 and having a recording width (Tp+$\beta$). Setting of $\beta$=$\gamma$ therefore makes all recording tracks have the recording width Tp.

In this way, formation of the recording tracks as being shifted by a predetermined distance P (=8 Tp) using the recording head section 10 makes it possible to sequentially fill the unrecorded regions on the magnetic tape 2, and to form the recording tracks of the identical recording width Tp on the magnetic tape 2, without producing gaps therebetween. In practice, any degradation in accuracy of assembly of the magnetic heads H11 to H14, and H21 to H24 onto the rotating drum 8, or any fluctuation in the rotation of the rotating drum 8 per se may result in similar variation (fluctuation) in the width of the recording tracks, but appropriate setting of the above-described overlapping width $\beta$, $\gamma$ makes it possible to reduce the fluctuation in the width of recording tracks formed on the magnetic tape 2, to equalize the width of the recording tracks, and to prevent any gaps from being produced between the recording tracks. In addition, magnetic information can accurately be reproduced, also when the recording density is raised in order to increase the transmission rate of recorded data.

In the above-described embodiments involving eight magnetic heads H11 to H14, and H21 to H24 formed by the thin-film process on the same non-magnetic substrate, no error in the attachment or no time-dependent changes will occur even if non-repeatable run-out (NRRO) of the rotating drum 8 per se (0.1 μm to 0.4 μm) should be added as an error, in contrast to a case where the individual magnetic heads are independently arranged channel by channel, or individually arranged on the multi-head basis. Division of the individual magnetic heads into two groups so as to reduce the number of films of the thin film multi-head also results in an improved positional accuracy of the magnetic poles, and facilitates magnetic recording with a narrow track pitch (1.5 μm or less).

The magnetic head device of the above-described embodiment has the magnetic heads H11 to H14, and H21 to H24, disposed by fours in two groups side by side, in which a smaller number of magnetic heads in one group will reduce the fabrication cost, as well as further improve the positional accuracy of the magnetic poles, because the number of the thin films to be stacked can be reduced.

For a case where m is 3 or larger, it is all enough to form the first-group and the m-th-group multi-heads similarly to as described above, and to form any other multi-heads disposed therebetween so that the first magnetic head as counted from the preceding recording track side, out of recording tracks formed by the multi-heads of the intermediate positions, has a magnetic pole width of (Tp+$\alpha$+$\beta$), and so that the q-th magnetic head on the opposite side has a magnetic pole width of Tp. This reduces possibilities that all of specific recording tracks are accidentally overwritten, and that gaps are produced between the recording tracks, even when fluctuation occurs in the rotating drum 8. In short, for any multi-head whose magnetic signals are overwritten by a magnetic head of other multi-head, effects of variation (fluctuation) in the track width can be reduced, if the magnetic pole width of the magnetic head is formed wider outwardly so as to give a recording width wider than the recording track width essentially required.

Although all magnetic heads in the above-described embodiments were arranged on the same single head chip 20 for recording, it is also allowable to dividedly arrange each of the multi-heads on a plurality of head chips. The present invention is by no means limited to the above-described embodiments, and operations and effects similar to those described in the above can be obtained if a plurality of recording head sections 10 are arranged on the rotating drum 8 to thereby respectively form a plurality of recording tracks with an identical recording width Tp. For example, two recording head sections 10 can be disposed at opposing positions 180° away from each other, centered round the axis of rotation, on the circumferential surface of the rotating drum 8. The recording tracks can be formed without producing gaps in between, by a design allowing the recording surfaces of the individual recording head sections 10 to scan the magnetic tape 2, and then allowing, in the next scanning by the other recording head sections 10, the magnetic heads thereof to scan positions shifted in the direction of track width by the distance P determined by the above-described equation (5).

The present document contains subject matter related to Japanese Patent Application JP 2004-206139 filed in the Japanese Patent Office on Jul. 13, 2004, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A magnetic head device for recording magnetic signals simultaneously through a plurality of recording heads into recording tracks laid oblique to a running direction of a magnetic tape, comprising:

first group to m-th group of multi-heads, each group having "q" recording heads disposed side by side as being shifted in a recording direction into the recording tracks to form (q×m) recording tracks with an identical recording width Tp, wherein:

every adjacent groups of the multi-head being disposed as being shifted from each other on the same straight line by a distance D determined by the equation (1), so as to simultaneously form the recording tracks of first group to m-th group:

$$D = Tp \times q \times (m \times n + 1) \quad (1)$$

where, Tp>0, q and m are integers of 2 or larger, and n is an integer of 0 or larger and indicates a number of unrecording regions of recording track groups in a single rotation of the rotating drum having the magnetic head device.

2. The magnetic head device as claimed in claim 1, wherein the "q" recording heads are disposed with a predetermined overlapping width at end portions of each pair of magnetic poles adjacent to each other in each of the multi-heads.

3. The magnetic head device as claimed in claim 2, wherein:

only the recording head whose recording track formed on the magnetic tape is not overwritten by the other recording head in the first group multi-head disposed on a preceding recording track side on the magnetic tape has a magnetic pole width equal to the recording width Tp, a first one and a q-th one of the recording heads in the m-th group multi-head disposed on an opposite side of the preceding recording track side are formed to have a magnetic pole width wider at an outer side so that a first one and a q-th one of the recording tracks among the recording tracks formed by the multi-head has a track width larger than the recording width Tp, and a first one of the recording heads forming the recording track in the multi-head other than the first group and the m-th group is formed to have a magnetic pole width wider at an outer side so that a first one of the recording tracks from the preceding recording track side among the recording tracks formed by the multi-head has a track width larger than the recording width Tp.

4. The magnetic head device as claimed in claim 1, wherein the first group to the m-th group multi-head is formed by stacking only q layers of m-pairs of thin film magnetic poles having a predetermined gap formed on an identical layer on an identical non-magnetic substrate with a respective magnetic shield therebetween.

5. A magnetic recording apparatus for recording magnetic signals simultaneously through a plurality of recording heads in an oblique direction with respect to a running direction of a magnetic tape, comprising:

a tape running unit allowing the magnetic tape to run at a predetermined speed, a magnetic head device which comprises first group to m-th group of multi-heads, each group having "q" recording heads disposed side by side as being shifted in a recording direction into recording tracks, so as to form (q×m) recording tracks with an identical recording width, and a rotating drum having the magnetic head mounted thereon, and rotating at a predetermined rotation speed relative to a running speed of the magnetic head, wherein:

every adjacent groups of the multi-head are disposed as being shifted from each other on the same straight line by a distance of D determined by the equation (2), so as to simultaneously form the recording tracks of first group to m-th group, and the rotation speed of the rotating drum and the running speed of the magnetic tape are adjusted so that the magnetic head forms recording tracks by a single scan and forms recording tracks by the next scan at positions shifted relative to the magnetic tape by a distance P determined by the equation (3):

$$D = Tp \times q \times (m \times n + 1) \quad (2)$$

$$P = Tp \times q \times m \quad (3)$$

where, Tp>0, q and m are integers of 2 or larger, and n is an integer of 0 or larger and indicates a number of unrecording regions of recording track groups in a single rotation of the rotating drum having the magnetic head device.

* * * * *